Jan. 17, 1950　　　H. M. MESSICK　　　2,494,774
HOSE COUPLING
Filed Nov. 2, 1946
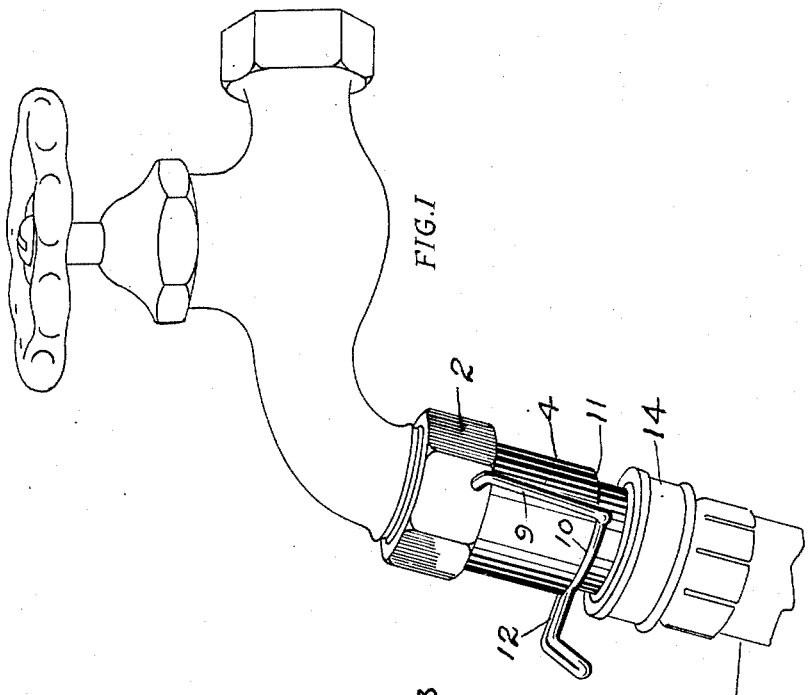
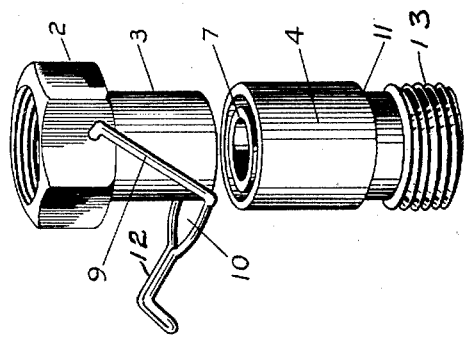
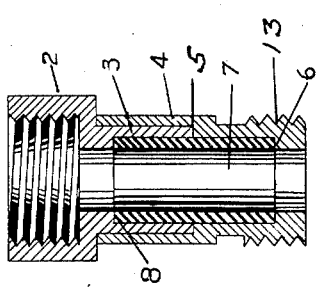
INVENTOR
Harry M. Messick
By F. C. Walker
Atty.

Patented Jan. 17, 1950

2,494,774

UNITED STATES PATENT OFFICE 2,494,774

HOSE COUPLING

Harry M. Messick, Springfield, Ohio

Application November 2, 1946, Serial No. 707,452

5 Claims. (Cl. 285—172)

This invention pertains to pipe and hose couplings, and more particularly to a quick detachable connection having a leak tight sealing joint.

The present coupling enables the interconnected members to be relatively freely rotated to prevent kinking of a connected hose, and embodies an expansible sealing member subject to internal fluid pressure overlapping the joint between separable coupling sections.

The object of the invention is to improve the construction, as well as the means and mode of operation of pipe and hose couplings, whereby they may not only be economically manufactured, but will be more efficient in use, automatic in operation, uniform in action, having minimum operating parts and will be unlikely to get out of repair.

A further object of the invention is to provide a telescopically engageable coupling having a simple latch device which will not interfere with freedom of relative rotation of the intercoupled members.

A further and important object of the invention is to provide a tubular expansible sealing member disposed in overlapping telescopic relation with succeeding intercoupled sections, and subject to expansive fluid pressure within the intercoupled conduits, to seal the joint therebetween.

A further object of the invention is to afford a leak proof quick detachable hose or pipe coupling, possessing the advantageous structural features, the inherent meritorious characteristics and operative in the manner herein set forth.

With the above primary and other incidental objects in view as will more fully appear in the specification, the invention intended to be protected by Letters Patent consists of the features of construction, the parts and combinations thereof, and the mode of operation, or their equivalents, as hereinafter described or illustrated in the accompanying drawings.

In the drawings wherein is shown the preferred, but obviously not necessarily the only form of embodiment thereof.

Fig. 1 is a perspective view of an interconnected hose coupling mounted upon a conventional bib faucet.

Fig. 2 is a perspective view of the disassembled parts of the coupling.

Fig. 3 is a longitudinal sectional view of the interconnected coupling members.

Like parts are indicated by similar characters of reference throughout the several views.

Referring to the drawings, 1 indicates a conventional bib type faucet, to the nose of which is screw threaded the head 2 of the initial tubular section 3 of the quick detachable coupling assembly forming the subject matter hereof. The section 3 is telescopically engageable within a mating section 4 having therein an internal offset or shoulder 5 upon which the free end of the section 3 abuts in their assembled relation as shown in Fig. 3.

Within the telescopically engaged sections 3 and 4 is an elongated tubular resilient sealing member 7, telescopically engaged with both the coupling sections 3 and 4 and abutting at its ends upon internal shoulders 6 and 8 thereof. The sealing member 7 is thus common to both the sections 3 and 4 and overlies and seals the joint 5 therebetween. The tubular resilient member 7 is preferably of rubber or of an analogous expansive material, and is subject to internal expanding pressure of fluid under pressure passing through the coupling. The bore of the sealing member 7 coincides with that of the sections 3 and 4. The member 7 is preferably seated within the section 4 against its shoulder 6 sufficiently tightly to retain its position therein when the coupling sections are disconnected as is shown in Fig. 2. Upon interengagement, the free end of the conduit section 3 is slidingly insertable intermediate the rigid wall of the outer section 4 and the inner relatively spaced flexible expansive inner tube 7.

Pivotally mounted on the head 2 of the section 3, is a swinging bail comprising parallel oscillatory arms 9, transversely connected at their free ends by an arcuate bight 10 which substantially conforms to the periphery of the conduit section 4, and is engageable beneath a peripheral shoulder 11 thereof to releasably maintain the sections 3 and 4 in interconnected relation. The swinging bail is preferably provided with a finger 12 by which the locking bail may be disengaged to release the coupling. The locking bail in no way interferes with the relative free rotation of the sections 3 and 4 when interconnected. The ability of the coupling sections to freely rotate, one relative to the other, minimizes the tendency of a connected flexible hose to acquire kinks while in use. The section 4 is shown provided with terminal screw threads 13 by which a flexible hose 15 may be interconnected with the coupling by a conventional screw collar 14. Section 4 may terminate in a conventional smooth spud or extension over which a section of hose may be clamped by a customary contractile clamp band permanently attaching the section 4 to a continuing hose.

The initial section 3 may be left permanently engaged with the faucet 1 or other source of fluid supply under pressure. The complementary section 4 and attached hose or pipe is easily connected and disconnected merely by oscillation of the locking bail 9—10 into and out of engagement with the external shoulder 11 of the section 4. While interconnected the member 4 is at all times free for unlimited rotation in either direction, thereby compensating for accidental twisting of the connected hose. The concentric tubular sealing member 7 has proven quite effective, and has withstood tests of water pressure of more than seventy pounds per square inch, and air pressure in excess of one hundred and twenty five pounds per square inch without indication of leakage. Being exteriorly supported at all times by the rigid wall of the sections 3 and 4, against internal expanding pressure the sealing member 7 is not likely to become unduly stretched or rendered defective.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. A hose or pipe coupling including two telescopically engageable conduit sections engageable respectively with supply and discharge conduits, an internal shoulder within one of said conduit sections, an external shoulder upon the other of said conduit sections, upon which the sections terminally abut one upon the other, a pair of internal shoulders within the respective conduit sections relatively spaced at opposite sides of the abutting internal joint between the telescopically engaged conduit members, a cylindrical resilient tube interposed in abutting relation within the last mentioned relatively spaced shoulders, the internal diameter of said tube being equal to the internal diameter of said shoulders, said tube extending in overlapping relation with the respective conduit sections at opposite sides of the abutting internal joint therebetween and subject to the expansive influence of fluid under pressure passing through the coupling.

2. A hose or pipe coupling, including two telescopically engageable sleeves, a latch device resisting disengagement of the sleeves while permitting unrestricted rotary motion of one sleeve relative to the other, a cylindrical uninterrupted surface formed within said sleeves upon telescopic engagement thereof and an elongated expansible concentric sealing tube carried by one of the sleeves and engageable with the uninterrupted cylindrical surface in concentric overlapping relation with the other sleeve and across the joint therebetween, said tube being subject to expansive influence of fluid pressure passing therethrough to force a tube into leak tight engagement with the smooth cylindrical surface.

3. A hose or pipe joint including a pair of abutting cylindrical conduit members, a peripheral recess extending on opposite sides of the butt joint intermediate said members, and an interior coaxial resilient tube positioned within said recess and extending in overlapping relation with the butt joint between said members and peripherally expansive under internal fluid pressure to effect simultaneous leak tight contact with both the conduit members, the construction and arrangement being such that the tube provides a continuing cylindrical surface intermediate the cylindrical conduit members, the wall of the peripheral recess affording a solid backing for the tube thereby preventing excessive flexing thereof.

4. A hose or pipe coupling, including a pair of relatively revoluble telescopically engageable conduit members, a peripheral shoulder upon the outermost conduit member, a releasable latch locking the telescopically engageable members in engaged relation while permitting unrestricted rotary motion of one conduit relative to the other comprising a pair of spaced swinging arms pivoted to opposite sides of the inner member beyond the extremity of the outer member, an arcuate tie connecting the ends of the swinging arms and engageable beneath the peripheral shoulder of the outer member to prevent axial disengagement of the telescopically engageable conduit members, and in relation to which the outermost conduit member is capable of relative rotative motion, and a finger lever projecting from the mid portion of the arcuate tie by which the latch member may be oscillated into and out of engagement with said peripheral shoulder.

5. A hose or pipe coupling, including a pair of telescopically engageable conduit members capable of unrestricted relative rotary motion, a peripheral shoulder on one of the members, an arcuate latch member peripherally engaging said member and removably engageable beneath the peripheral shoulder thereof for preventing relative axial movement of the members out of engagement with each other, but permitting free relative rotary motion thereof, and a fluid pressure operated sealing member within the conduit members extending in overlapping peripherally aligned relation therewith and expanded into sealing engagement therewith by the influence of fluid under pressure being conducted through the telescopically engageable conduit members and the sealing member therein.

HARRY M. MESSICK.

REFERENCES CITED

The following references are of record in the file of this patent:

UNITED STATES PATENTS

| Number | Name | Date |
|---|---|---|
| 32,135 | Jones | Apr. 23, 1861 |
| 1,926,949 | Kennedy | Sept. 12, 1933 |